(12) United States Patent
Wu et al.

(10) Patent No.: US 8,116,928 B2
(45) Date of Patent: Feb. 14, 2012

(54) AUTOMATIC ULTRASONIC AND COMPUTER-VISION NAVIGATION DEVICE AND METHOD USING THE SAME

(75) Inventors: Chih-Jen Wu, Tainan (TW);
Shung-Yung Tsai, Jhonghe (TW);
Wen-Hsiang Tsai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 571 days.

(21) Appl. No.: 12/365,190

(22) Filed: Feb. 4, 2009

(65) Prior Publication Data

US 2010/0042319 A1    Feb. 18, 2010

(30) Foreign Application Priority Data

Aug. 15, 2008   (TW) .............................. 97131096 A (51) Int. Cl.
*G01C 22/00*   (2006.01)
*G01M 17/00*   (2006.01)
*G06F 19/00*   (2011.01)
*G06G 7/70*    (2006.01)
*G05B 19/18*   (2006.01)

(52) U.S. Cl. .............. 701/23; 701/28; 701/35; 701/110; 700/253

(58) Field of Classification Search ........................ None
See application file for complete search history.

(56) References Cited

U.S. PATENT DOCUMENTS

| 7,684,894 | B2 * | 3/2010 | Sakai et al. | 700/245 |
| 7,818,090 | B2 * | 10/2010 | Okamoto | 700/253 |
| 2004/0028260 | A1 | 2/2004 | Higaki et al. | |
| 2004/0199292 | A1 | 10/2004 | Sakagami et al. | |
| 2006/0136097 | A1 | 6/2006 | Kim et al. | |
| 2006/0184274 | A1 | 8/2006 | Sakai et al. | |
| 2007/0199108 | A1 | 8/2007 | Angle et al. | |
| 2007/0233318 | A1 * | 10/2007 | Lei | 700/245 |

FOREIGN PATENT DOCUMENTS

| TW | 466389 | 12/2001 |
| TW | 00552488 | 9/2003 |
| TW | I242701 | 11/2005 |

* cited by examiner

*Primary Examiner* — Ryan Zeender
*Assistant Examiner* — Hajime Rojas
(74) *Attorney, Agent, or Firm* — Rosenberg, Klein & Lee (57) ABSTRACT

The present invention discloses an automatic ultrasonic and computer-vision navigation device and a method using the same. In the method of the present invention, the user guides an automatic navigation device to learn and plan a navigation path; next, the automatic navigation device navigates independently and uses ultrasonic signals and computer vision to detect the environment; then, the automatic navigation device compares the detected environment data with the navigation path to amend the physical movement track. The present invention enables ordinary persons to interact with the automatic navigation device without operating the computer. As the present invention adopts computer vision and ultrasonic signals to realize the functions thereof, the manufacturers can save the hardware cost.

28 Claims, 10 Drawing Sheets

AUTOMATIC ULTRASONIC AND COMPUTER-VISION NAVIGATION DEVICE AND METHOD USING THE SAME

BACKGROUND OF THE INVENTION

1. Field of the Invention

The present invention relates to a navigation technology, particularly to an automatic ultrasonic and computer-vision navigation device and a method using the same.

2. Description of the Related Art

More than twenty years has elapsed since the emergence of robots. The current developments of robots are usually directed to the publications thereof. The industrial robots have been fully developed to have high reliability and are still progressing. The entertainment- or service-type robots also have much potential in such as security, exposition guide, children nursing service, etc., and they are usually called the intelligent robots because they are expected to behave like human beings. Thus, the image recognizing, tracing and positioning technologies are critical for the intelligent robots.

Below are briefly cited some prior arts of the ultrasonic and computer-vision technologies for the intelligent robots. Among them, the Taiwan patent No. I242701 lacks local navigation ability. The Taiwan patent No. I147185 and the US patent publication No. 20060199108 adopt a laser radar, which harms eyes and has a price several times higher than an ultrasonic sensor, wherefore ordinary families are hard to afford it. The US publication patent No. 20060136097 has a low hardware cost, but it needs an additional light emitter to enable a vehicle to receive light and locate the position indoors. The US patent publication No. 20070199108 has a navigation function, but it cannot follow the user to construct a navigation map. The US patent publication No. 20040199292 only emphasizes a technology enabling a robot to follow the user. The US patent publication No. 20040028260 emphasizes a technology obtaining instructions from analyzing the images of the user's movements, but it does not apply the technology to enable the robot to learn a path. The Taiwan patent publication No. 200810588 uses a pan/tilt/zoom (PTZ) image capture device to trace a moving object. The Taiwan patent publication No. 200818032 can perform image recognition. The Taiwan patent publication No. 200709075 can detect and recognize human faces. The Taiwan patent No. 266474 proposes a camera structure for recognizing human faces. The Taiwan patent No. I95162 can grasp the features of human faces from images. The Taiwan patent No. I267793 proposes an editable image feature comparison method. However, all the abovementioned technologies can neither eliminate the interference from reflected light nor enhance the colors. The Taiwan patent No. 191309 uses a software technology to compensate images; however, it has two disadvantages: firstly, it can only compensate the images of human faces; secondly, it cannot compensate images unless the light interference is moderate or less. In other words, the technology can neither find out the approximate curved surfaces nor compensate the images unless the computer vision technology can find out human-face regions from the original images.

The Taiwan patent No. M33678 makes use of wireless network communication. The Taiwan patent No. I292109 uses a wired or wireless transmission to update the security data of robots. In the Taiwan patent No. I287498, a robot uses a wireless module to receive instructions. In the Taiwan patent No. I238622, the control system of a robot can undertake an Ethernet communication or a wireless network communication. The Taiwan patent No. 542739 uses an infrared technology to transmit positioning data and distance data for robots. In some of the abovementioned prior-art patents, for example, the patents of No. I283978 and No. I277320, the data is too massive to be transmitted by the available bandwidth. In some of the abovementioned prior-art patents, for example, the patents of No. M33678, No. I292109 and No. I238622, the Inventors did not take into consideration the fact that the communication system depends on the roaming and repeating capabilities in a vast space. Some of the abovementioned prior-art patents focus on information exchange and the optimization thereof, but they are all static WDS (Wireless Distribution System), which lack an automatic navigation function, cannot move according to instructions, and are unable to provide communication service for users.

Thus, the present invention proposes an automatic ultrasonic and computer-vision navigation device and a method using the same, which are based on image tracing, image comparing, human-face detection, position measuring, path planning, and ultrasonic technologies, and which can learn visual landmarks automatically, optimize the path from a narrow passage, and detect positions and amend the track visually, whereby even the persons not familiar with the computer can also instruct the navigation device and interact with the navigation device.

SUMMARY OF THE INVENTION

The primary objective of the present invention is to provide an automatic ultrasonic and computer-vision navigation device and a method using the same, which are based on image tracing, image comparing, human face detection, position measuring, path planning, and ultrasonic technologies, and which can learn visual landmarks automatically, optimize the path from a narrow passage, and detect positions and amend the track visually, whereby even the persons not familiar with the computer can also instruct the navigation device and interact with the navigation device.

Another objective of the present invention is to provide an automatic ultrasonic and computer-vision navigation device and a method using the same, which uses visual and ultrasonic detectors to detect the environment, wherefore the manufacturers can save the production cost.

To achieve the abovementioned objectives, the present invention proposes an automatic ultrasonic and computer-vision navigation device, which comprises an automatic movement device, a distance detection device, a position detection device, an image detection device, a controller, and a far-end communication device. The distance detection device, position detection device, image detection device, controller, and far-end communication device are arranged in the automatic movement device. The image detection device uses computer vision to detect the surrounding images and outputs image data. A polarizer is installed on the image detection device to eliminate reflected light and enhance colors when the image detection device uses computer vision to detect the surrounding images, whereby the image detection and recognition becomes more reliable. The distance detection device uses ultrasonic signals to detect the distances between the surrounding barriers and the automatic movement device and outputs distance data. The position detection device detects the position of the automatic movement device and outputs position data. The controller receives and records the image data, distance data and position data. According to the data, the controller works out a navigation path and controls the movement of the automatic movement device. Not limited by bandwidth and the size of indoor space, the far-end communication device enables the automatic navigation device carrying detectors to share the data acquired and analyzed in movement. Further, the far-end communication device functions as a repeater of other users or automatic navigation devices.

The present invention also proposes a navigation method using ultrasonic signals and computer vision, wherein the user guides an automatic navigation device to learn and plan a navigation path; next, the automatic navigation device navigates independently and uses ultrasonic signals and computer vision to detect the environment; then, the automatic navigation device compares the detected environment data with the navigation path to amend the physical movement track.

Below, the embodiments are described in detailed in cooperation with the attached drawings to make easily understood the technical contents, characteristics, and accomplishments of the present invention.

DETAILED DESCRIPTION OF THE INVENTION

Figure 1:
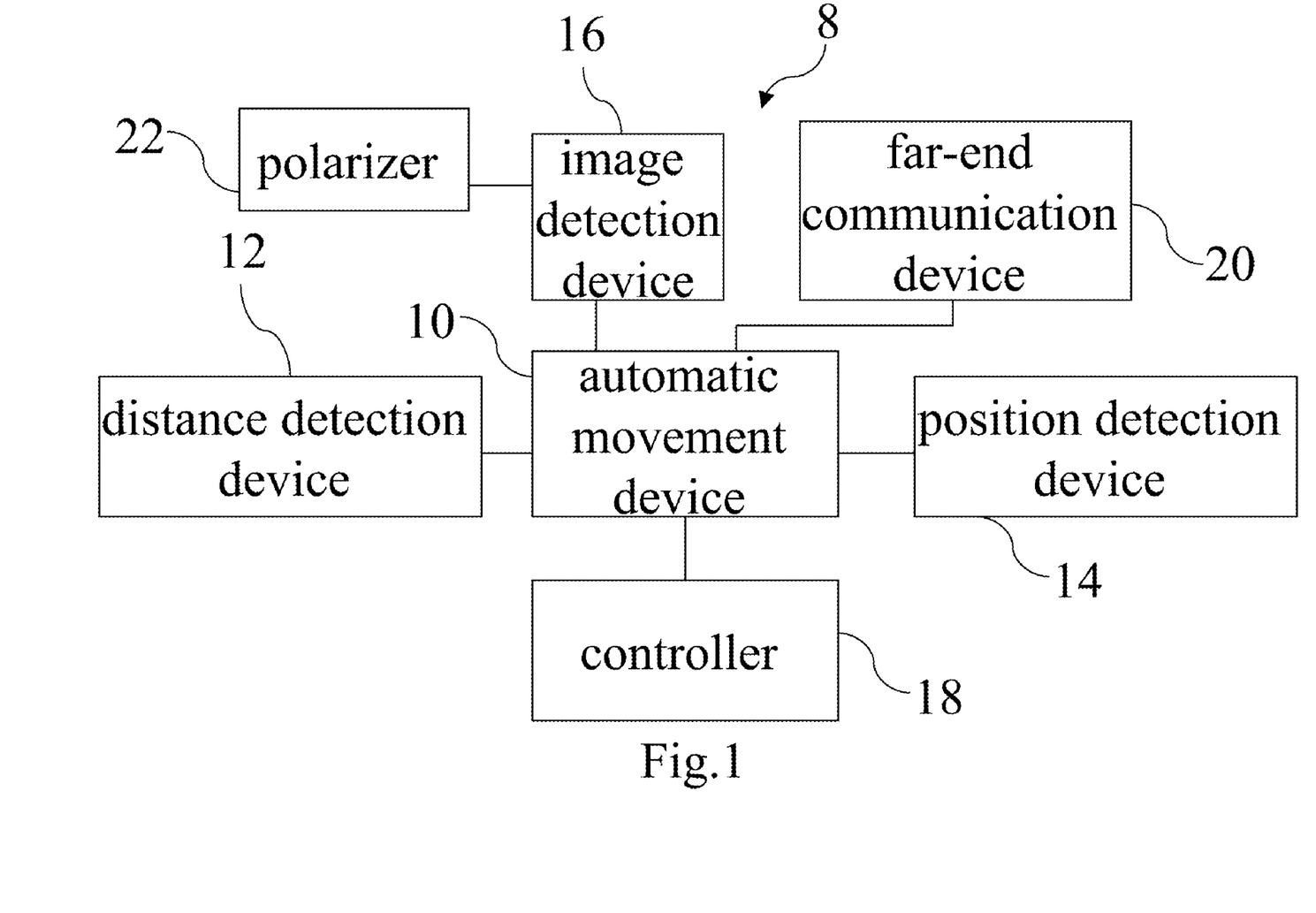
FIG. 1 is a diagram schematically showing the circuit of an automatic navigation device according to an embodiment of the present invention.
Figure 2:
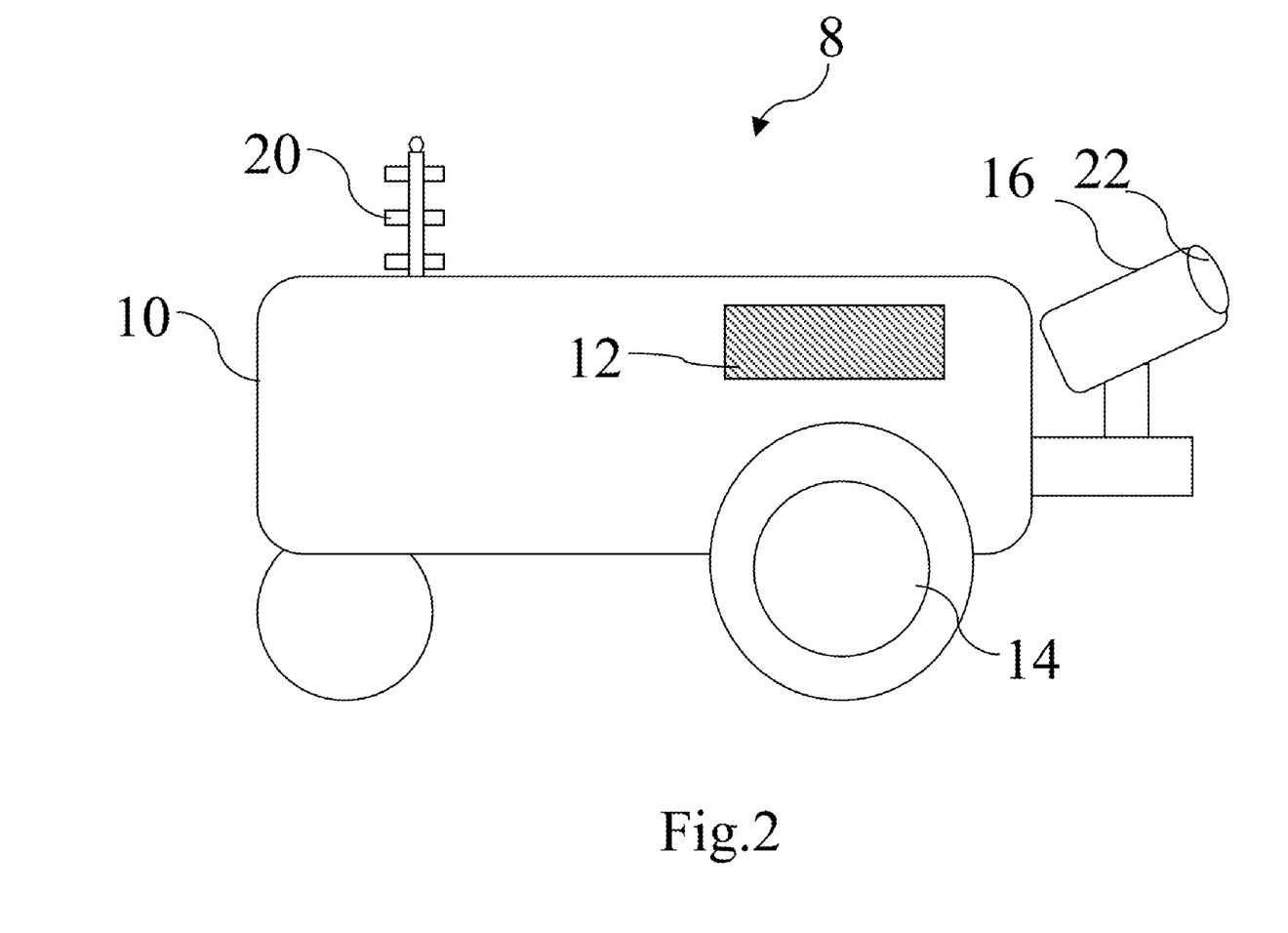
FIG. 2 is a diagram schematically showing the structure of an automatic navigation device according to FIG. 1.

Refer to FIG. 1 and FIG. 2. The automatic navigation device 8 of the present invention comprises an automatic movement device 10. The automatic navigation device 8 also comprises a distance detection device 12, a position detection device 14, an image detection device 16, and a controller 18, which are all arranged in the automatic movement device 10. The image detection device 16 uses the computer vision to detect the surrounding images and outputs image data. The distance detection device 12 uses ultrasonic signals to detect the distances between the surrounding barriers and the automatic movement device 10 and outputs distance data. The position detection device 14 detects the position of the automatic movement device 10 and outputs position data. The controller 18 receives and records the image data, distance data and position data. According to the data, the controller 18 works out a navigation path and controls the movement of the automatic movement device 10.

The image detection device 16 senses optical signals and transmits images and is formed of a semiconductor element, such as CCD (Charge Coupled Device) or CMOS (Complementary Metal Oxide Semiconductor). The image detection device 16 may be a PTZ (Pan Tilt Zoom) camera, a wide-angle camera, or a panoramic camera. In a learning mode, the image detection device 16 can demarcate the top wear of a user in the image regions according to the user's skin color, profile, body size, and body proportions in images and according to the image variation resulting from the user's movements before the image detection device 16. Then, the image detection device 16 outputs image data.

In general, image tracing and image recognition are likely to be influenced by light variation and thus unlikely to achieve the expected reliability. The problem is particularly obvious to a navigation device because a navigation device often moves constantly and is difficult to expect that there is always a uniform illumination condition. In the present invention, a polarizer 22 is used to eliminate reflected light and enhance colors when the navigation device uses computer vision to detect the environment, whereby the visual tracing and recognition becomes more reliable.

The direction of the grating films on the polarizer 22 can be manually operated by the user or automatically controlled by the controller 18 to filter out the light degrading the images, whereby the reflected light is eliminated and colors are enhanced. Thus are more reliable the human-face detection, human-face recognition, person tracing, image comparison, image positioning, navigation of the computer vision.

There are two modes to control the polarizer 22. One mode is: the controller 18 determines whether there is reflection interference or receiving an instruction of the controller 18 in the images according to image data; if the answer is yes, the controller 18 instructs the image detection device 16 to automatically vary the direction of the grating films to reduce the reflection interference; if the answer is no, the controller 18 stops to operate. The other mode is: the controller 18 determines whether there is reflection interference in the images or checks whether the computer vision process is unable to attain the expected result according to image data; if the answer is yes, the controller 18 instructs the image detection device 16 to automatically vary the direction of the grating film to reduce the reflection interference; if the answer is no, the controller 18 stops to operate.

The controller 18 controls the direction of the automatic movement device 10 according to the horizontal position of the top wear of the user in the image region. The controller 18 calculates the distance between the user and the automatic movement device 10 according to the size and vertical position of the top wear of the user in the image region. Then, the controller 18 controls the speed of the automatic movement device 10 and enables the automatic movement device 10 to keep a constant distance to the user.

The controller 18 can identify whether the automatic movement device 10 faces the lateral of the user according to the ratio of the length and width of the top wear of the user in the image regions. When the automatic movement device 10 faces the lateral of the user, the controller 18 can identify the direction that the user faces toward according to the proportion and relative position of the face contour, facial features and hair of the user. Then, the controller 18 controls the automatic movement device 10 to move toward the user and controls the image detection device 16 to face toward the direction that the user faces toward to capture the image exactly in front of the user. Then, the controller 18 calculates and outputs image data, which includes the images themselves and the positions and directions of the objects (or called the landmarks) in the images.

The distance detection device 12 persistently emits ultrasonic signals and receives the reflected ultrasonic signals. Then, the distance detection device 12 calculates the distances between the automatic movement device 10 and the barriers surrounding the automatic movement device 10 according to the time lag between the emitted ultrasonic signals and the reflected ultrasonic signals. Then, the controller 18 determines the positions of the barriers in the navigation path according to the distance data.

The position detection device 14 is an odometer, which calculates the current direction and coordinates of the automatic movement device 10 according to the revolutions of the wheels of the automatic movement device 10.

Based on the image data, distance data, position data and data of barriers' positions, the controller 18 plans a navigation track, then, the controller 18 shortens the a navigation track to plan the a navigation path according to positions of the barriers and the rules of preventing the automatic navigation device 8 from colliding with barriers.

After the automatic navigation device 8 completes planning the path, the controller controls the automatic movement device 10 to navigate independently. During navigation, the controller 18 compares the physical movement track of the automatic movement device 10 with the planned navigation path and then amends the movement track. The controller 18 also compares the physical movement track and the distance data. When the automatic movement device 10 deviates from the planned navigation path during navigation, the controller 18 amends the movement track and restores the automatic movement device 10 back to the planned navigation path. Then, the automatic movement device 10 moves on the lane between barriers.

When the automatic movement device navigates independently, the controller 18 determines whether to alter the direction of the automatic movement device 10 via comparing the distance data and the path data the user input into the controller 18 in advance or comparing the distance data and the navigation path.

When the automatic movement device 10 navigates independently, the controller 19 compares the position data and distance data with the path data stored into the controller in advance to estimate the current coordinates and direction of the automatic movement device 10. Suppose there is a landmark appearing when the automatic movement device 10 navigates independently; the controller 18 compares the stored landmark image with the image currently captured by the image detection device 16 to determine whether it is an identical landmark. If it is an identical landmark, the controller 18 works out the current position and angle of the landmark with respect to the automatic movement device 10 from the currently captured landmark image. Then, the controller 18 compares the current position and direction of the landmark with the position and angle of the landmark stored into the controller 18 in advance to estimate the current coordinates and direction of the automatic movement device 10 more accurately, whereby the controller 18 can amend the position and direction of the automatic movement device 10 more precisely. If the comparison shows that it is not an identical landmark, the controller 18 varies the direction of the grating films of the polarizer 22 and performs a new comparison until all the directions of the grating films are used up, or until the comparison confirms the landmark.

The controller 18 may be a far-end controller or a controller integrated with the automatic movement device 10. The controller 18 determines whether the automatic navigation device 8 should execute a learning mode. The controller 18 can use image data to identify whether a person is a authorized user. If the person is a authorized user, the controller 18 enables the automatic movement device 10 to navigate independently. If the person is not a authorized user, the controller 18 stops to operate.

It is natural to have a communication system for such a navigation device carrying a lot of detectors and capable of navigating and operating autonomously in a vast space. Otherwise, it cannot share with the external the acquired and analyzed data, and the personnel-substitute functions thereof-the active detection, tracing, positioning and navigation functions-become meaningless. However, such a communication system needs to overcome three problems: firstly, it needs bandwidth sufficient to transmit video data in realtime; secondly, it should not be limited by the wired or wireless transmission distance but able to roam in a vast indoor space; thirdly, each navigation device should be a signal repeater of other navigation devices to implement a communication mesh network facilitating the disposition of a lot of navigation devices and providing communication service for users. Therefore, the embodiment constructs a WDS (Wireless Distribution System) in the navigation device to achieve the three abovementioned targets.

Figure 3:
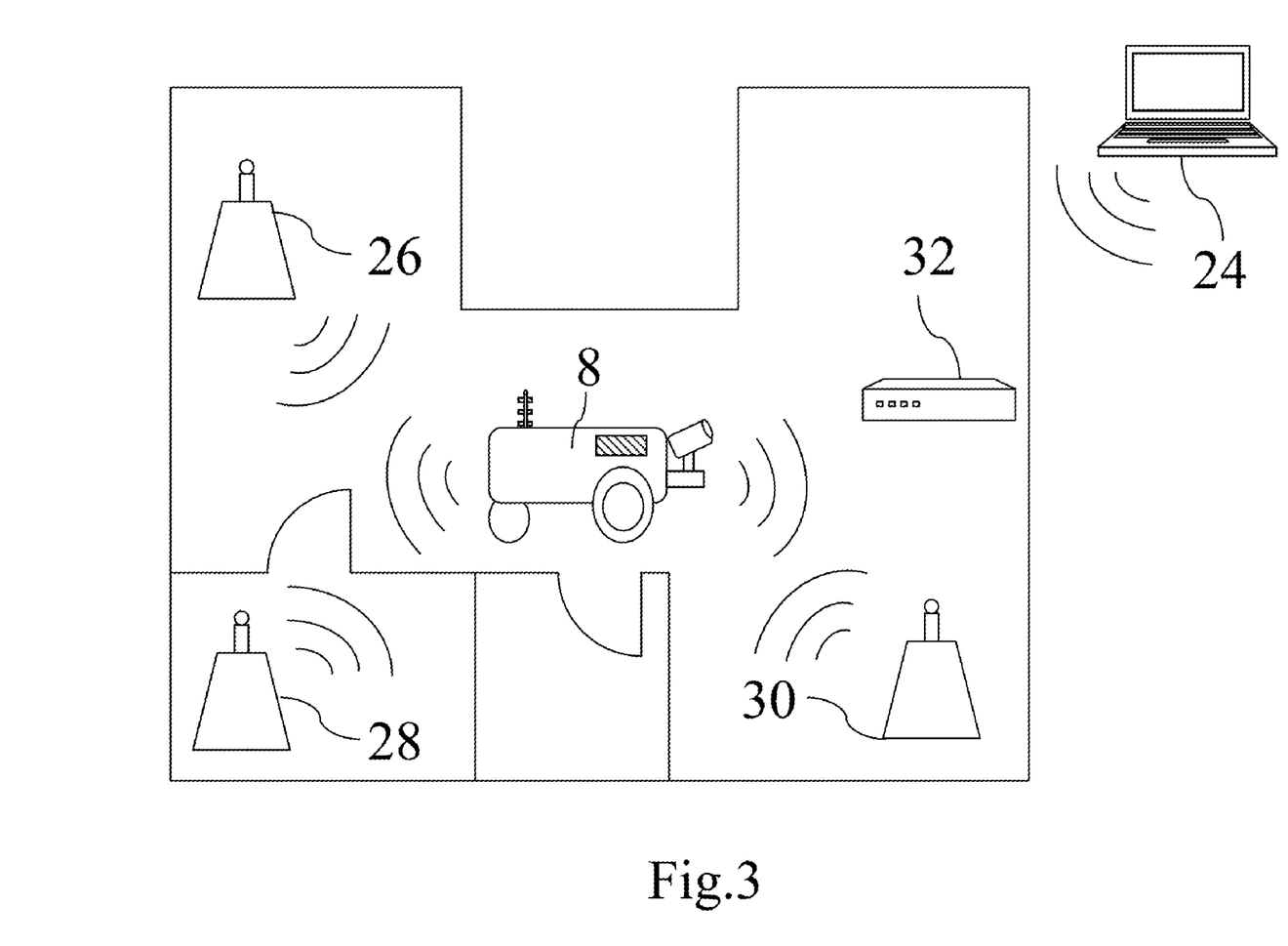
FIG. 3 is a diagram schematically showing the operation of a far-end communication device of an automatic navigation device according to FIG. 1.

Refer to FIG. 2 and FIG. 3. The present invention further comprises a far-end communication device 20 arranged in the automatic movement device 10. The far-end communication device 20 receives image data, distance data, position data and navigation paths in a wired or wireless way. The far-end communication device 20 wirelessly transmits the data to the far-end control center or monitors in realtime directly or via access points 26, 28 and 30, whereby the control center or monitors can monitor the operations of the navigation device. The wireless communication adopts a WDS mode of IEEE 802.11.

When used in an indoor space, the far-end communication device 20 may be a mobile access point complying with the standard of IEEE 802.11 and cooperates with other access points 26, 28 and 30 to form a wireless mesh network. Thereby, the far-end communication device 20 is not limited by the size of the indoor space and the bandwidth but able to transmit the acquired or analyzed data to the external during navigation. If there are other navigation devices, the far-end communication device 20 may further function as a repeater of the other navigation devices or other users. The far-end communication device 20 may further function as a mobile repeater, which can move to the area where the signal is weak to provide signal relay.

The user may assign a destination to the far-end communication device 20. After the far-end communication device 20 receives the destination, the automatic navigation device 8 moves the far-end communication device 20 to the destination where the far-end communication device 20 enables the local computers 24 and IP sharers to access the network wirelessly. Therefore, the area of the wireless network is dynamically expanded.

Figure 4:
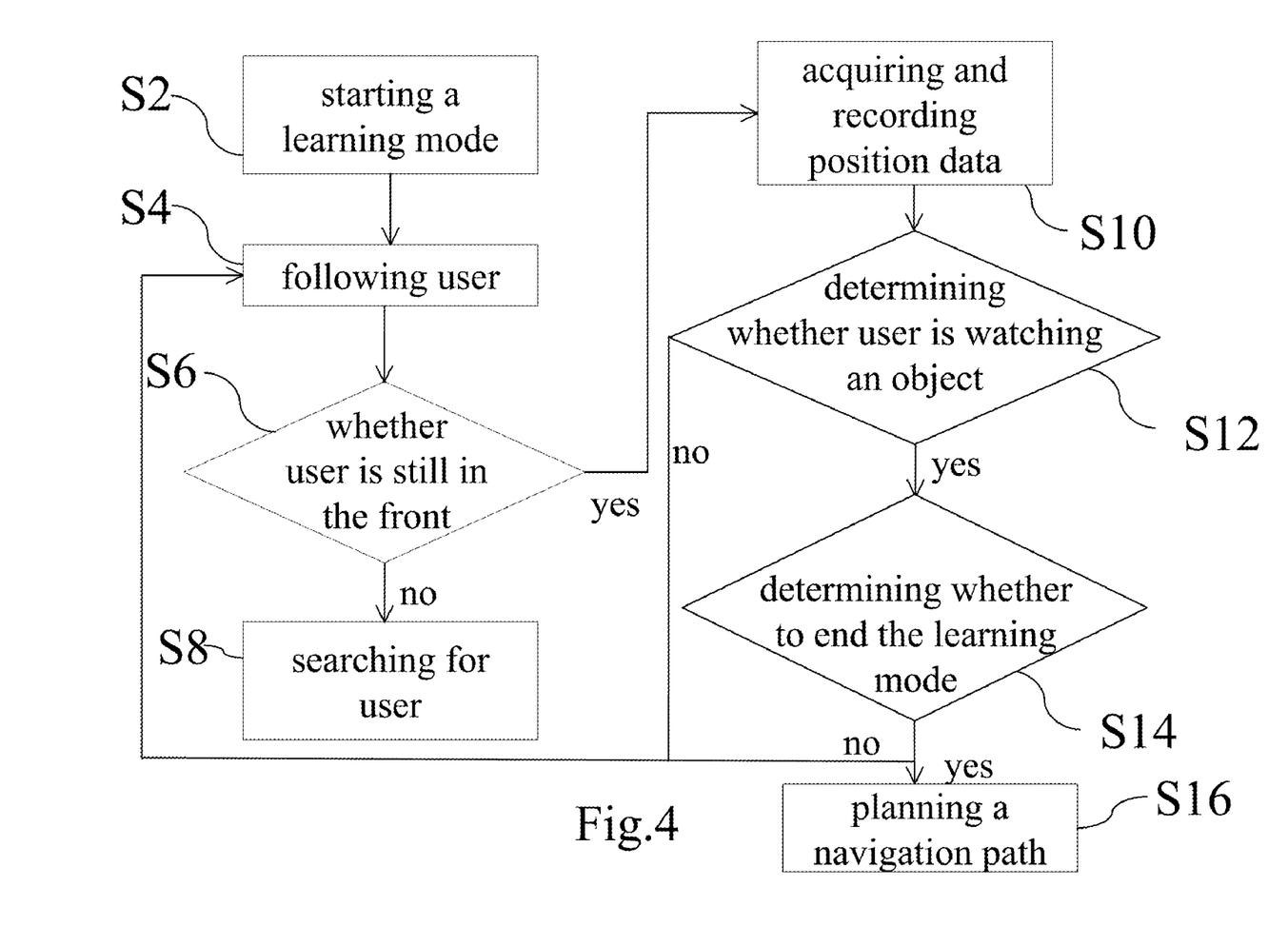
FIG. 4 is a flowchart of a navigation method according to an embodiment of the present invention.

In the stages of following the user and learning visually, the automatic navigation device 8 can autonomously learn to construct a navigation path although the user does not operate the computer. Refer to FIG. 1, FIG. 2 and FIG. 4. In Step S2, the user stand in front of the automatic navigation device 8, and the controller 18 starts the learning mode of the automatic navigation device 8. In Step S4, the automatic navigation device 8 follows the moving user. In Step S6, the automatic navigation device 8 uses the image detection device 16 to verify whether the user is still in front of the automatic navigation device 8. If the answer is yes, the process proceeds to Step S10. If the answer is no, the process proceeds to Step S8. In Step S8, the automatic navigation device 8 searches to define the position of the user. In Step S10, the distance detection device 12, position detection device 14 and image detection device 16 are respectively used to detect the position and environment of the automatic navigation device 8; the image detection device 16 uses the computer-vision technology to detect and record images surrounding the automatic navigation device 8; the distance detection device 12 uses ultrasonic signals to detect and record the distances between the barriers and the automatic navigation device 8; the position detection device 14 detects and records the coordinates and direction of the automatic navigation device 8. In Step S12, the image detection device 16 uses computer vision to detect the direction that the user faces toward according to the proportion and relative position of the face contour, facial features and hair of the user. Then, the image detection device 16 observes whether the user stops to watch an object, i.e. a landmark. If the answer is yes, the process proceeds to Step S14. If the answer is no, the process returns to Step S4. In Step S14, the automatic navigation device 8 moves toward the user, and the image detection device 16 uses the computer vision to detect and record the abovementioned landmark. Then, the controller 18 determines whether to end the learning mode. If the answer is yes, the process proceeds to Sep S16. If the answer is no, the process returns to Step S4.

Figure 5A:
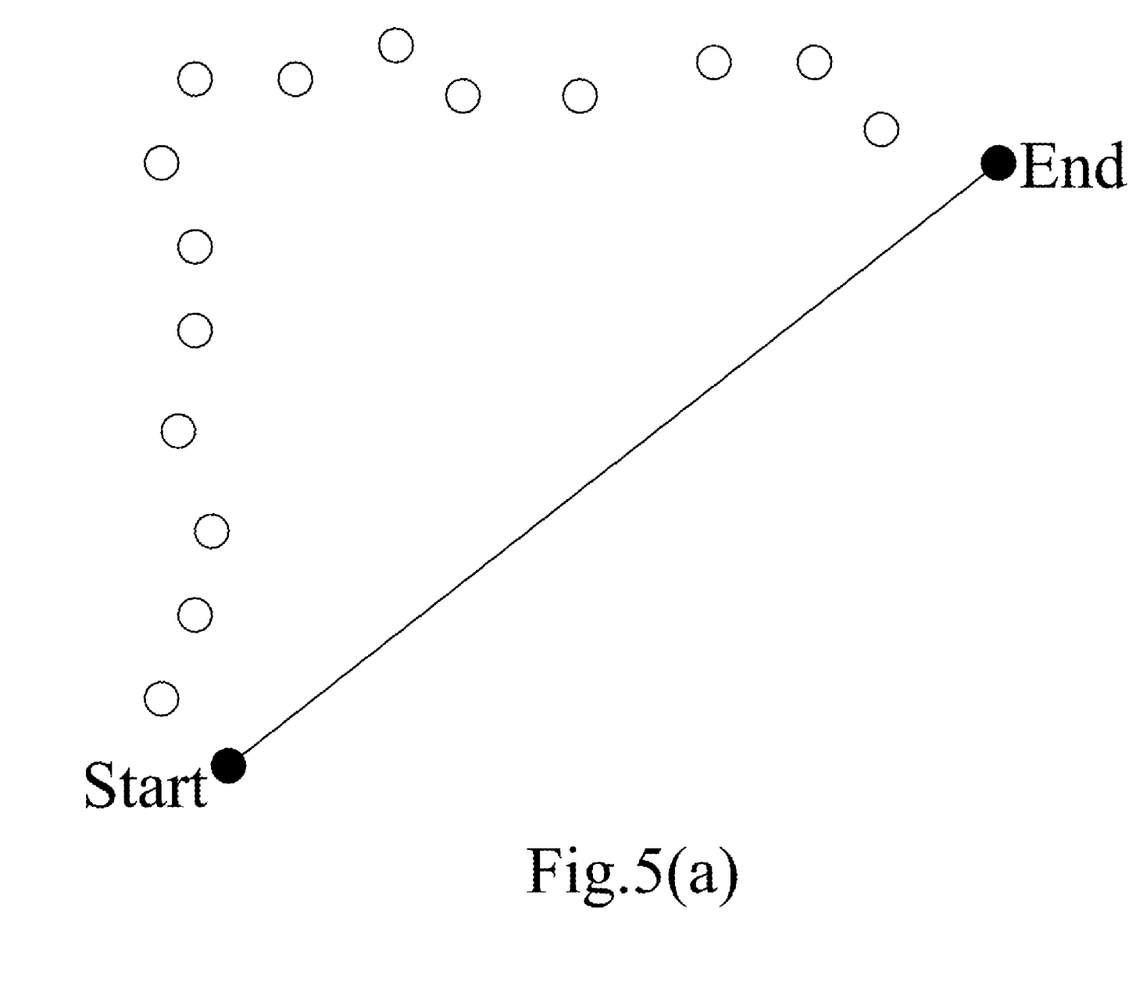
FIGS. 5(a)-5(c) are diagrams schematically showing navigation paths according to an embodiment of the present invention.
Figure 5B:
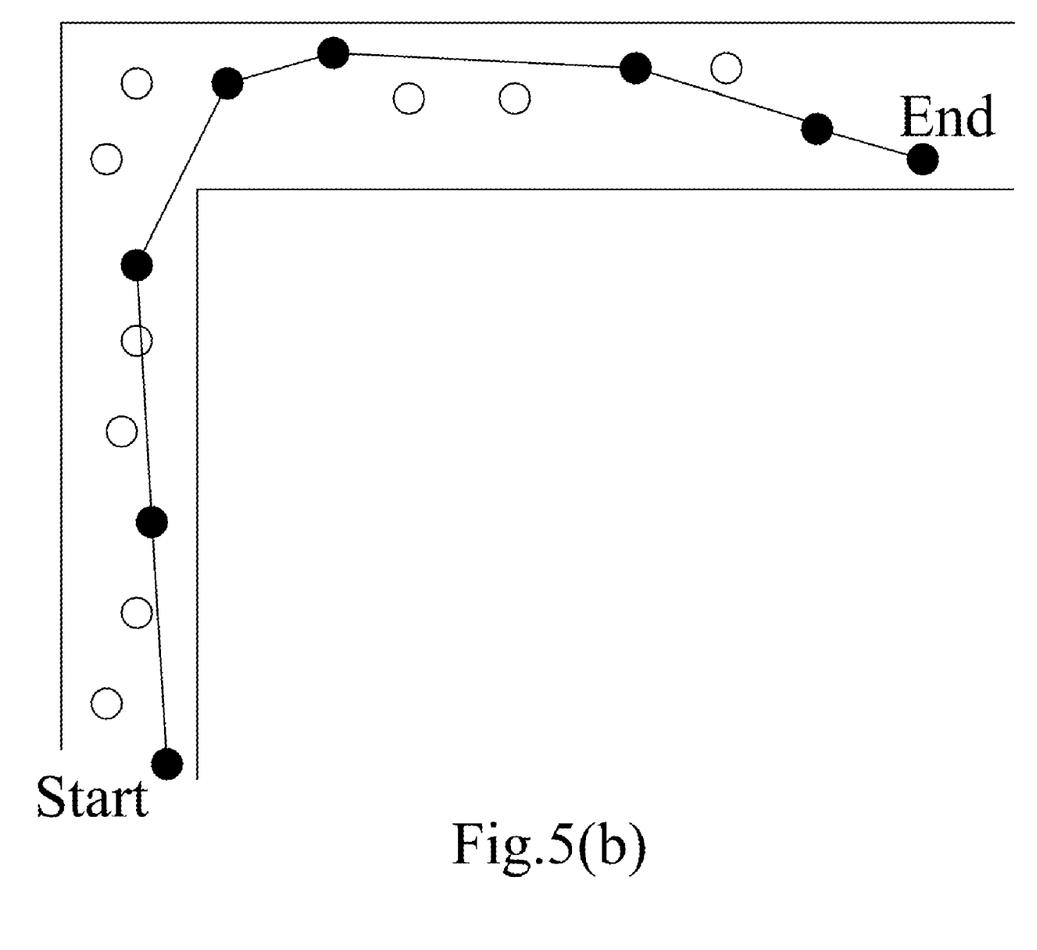
Figure 5C:
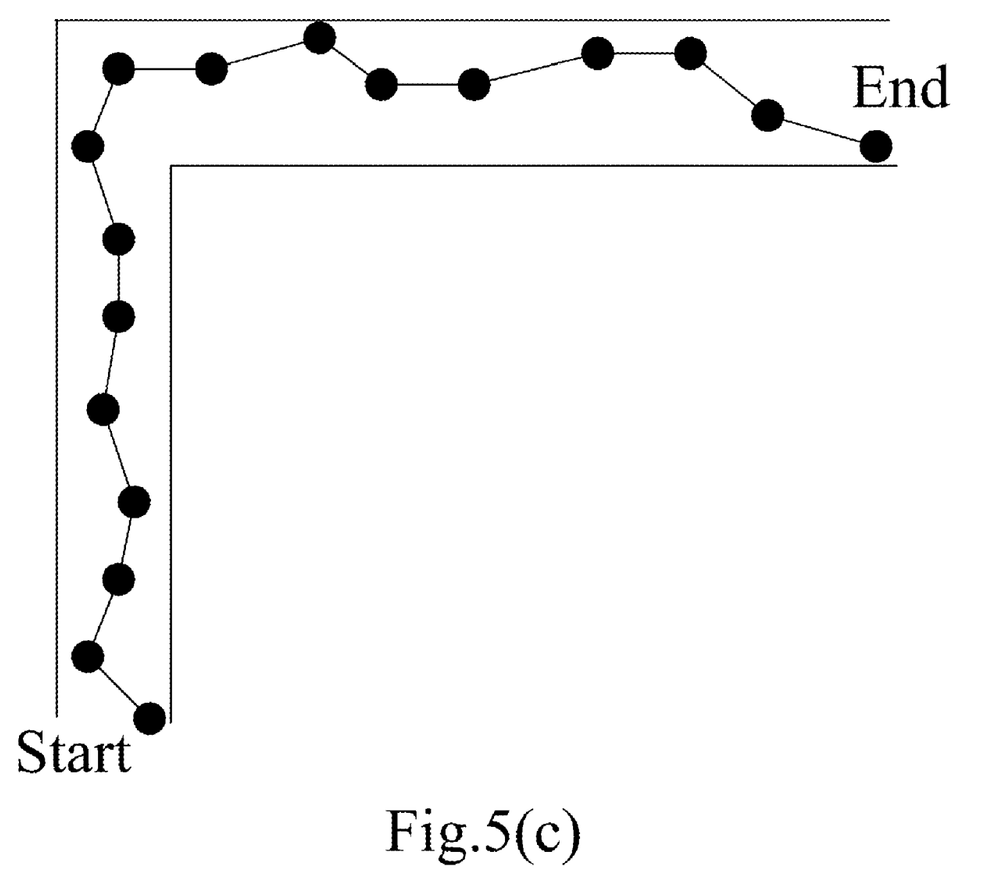

In Step S14, after ending the learning mode, the controller 18 uses the recorded data to plan a navigation track, then, the controller 18 optimizes the navigation track to plan the navigation path according to positions of barriers surrounding around the automatic navigation device 8 and the rules of preventing the automatic navigation device 8 from colliding with the barriers. Refer to FIG. 5(*a*). The hollow circles represent the positions the automatic navigation device has passed in the learning mode, and the straight line connecting the solid circles represents an ideal navigation path. However, the automatic navigation device 8 will bump into barriers in the ideal navigation path. Refer to FIG. 5(*b*). Therefore, when the passage is not so narrow, the automatic navigation device 8 will plan a navigation path represented by the curve formed of a plurality of straight lines, as shown in FIG. 5(*b*), wherein the controller 18 selects the recorded positions as few as possible to form the curve and construct a navigation path as short as possible but prevents the automatic navigation device 8 from bumping into barriers. Refer to FIG. 5(*c*). When the passage is narrow, the automatic navigation device 8 will plan a navigation path represented by the curve formed by connecting all the recorded positions, as shown in FIG. 5(*c*), to prevent the automatic navigation device 8 from bumping into barriers in the narrow passage.

Some special navigation points cannot be omitted in shortening the navigation path. The first type of non-omitted points is the turning points where the automatic navigation device 8 performs a large-angle turning in the learning mode. The second type of non-omitted points is the positioning points where the automatic navigation device 8 records images to set a landmark in the learning mode.

The automatic navigation device 8 can use the image detection device 16 and computer vision to identify whether a person is a authorized user. If the person is a authorized user, the controller 18 enables automatic navigation device 8 to navigate independently. If the person is not a authorized user, the controller 18 stops to operate.

When computer vision finds that the environment is different from that of the planned navigation path during navigation, the automatic navigation device transmits the data to the far-end control center or monitors via the network. When the automatic navigation device uses computer vision to detect the environment, the polarizer can filter out the image-damaging polarized light to eliminate reflection and enhance colors. Additionally, the far-end communication device operating in the WDS mode of an IEEE 802.11 standard can support wireless network access and wireless communication.

Figure 6:
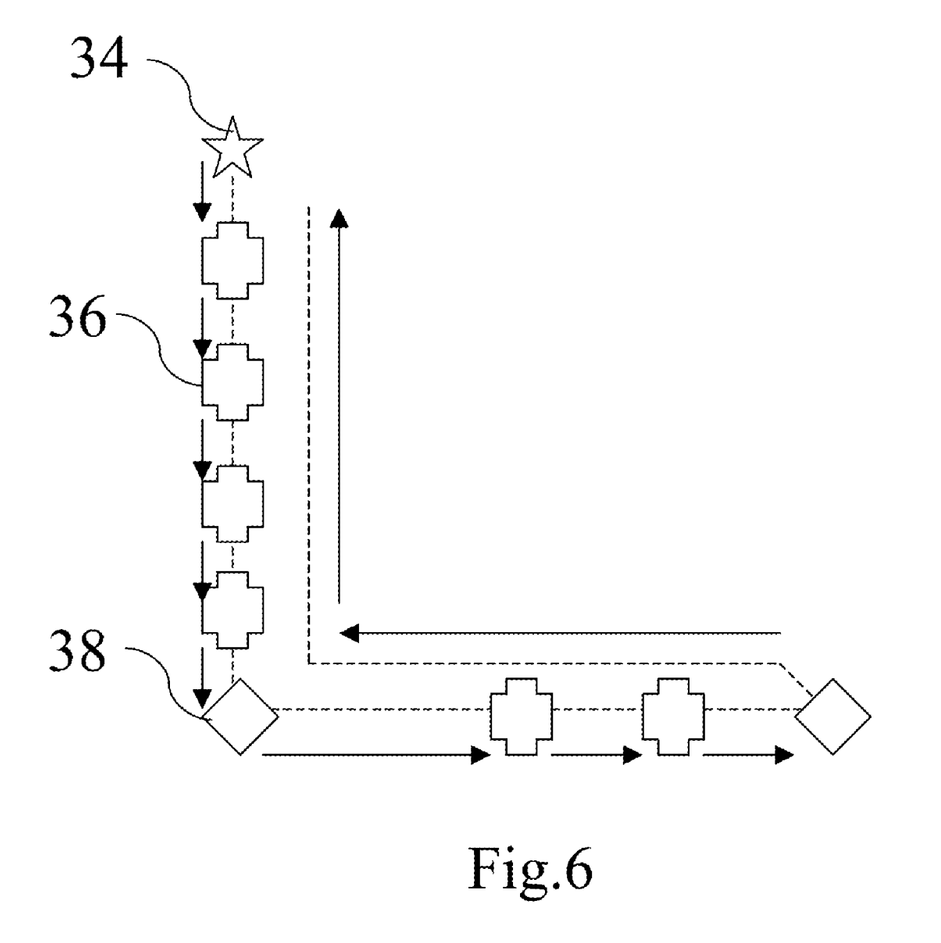
FIG. 6 is a diagram schematically showing the paths of a learning mode and an independent navigation of an automatic navigation device according to an embodiment of the present invention.

Refer to FIG. 6. The dotted line represents the path in the learning mode, and the solid arrowheaded line represents the physical movement track. As shown in F*ig*.6, the planned navigation path from point 34 does not omit the turning point 38 and the positioning point 36. When the controller 18 controls the automatic movement device 10 to navigate independently, the distance detection device uses ultrasonic signals to detect the distances to barriers to amend the physical movement track and enable the automatic navigation device to move on the lane between barriers. The distance detection device enables the automatic navigation device to determine whether to alter its direction. The automatic navigation device uses the distance detection device to detect the coordinates and direction thereof and uses the computer vision of the image detection device to detect the environment thereof and then compares the currently acquired data with that of the planned navigation path, whereby the automatic navigation device can amend the physical movement track.

Figure 7:
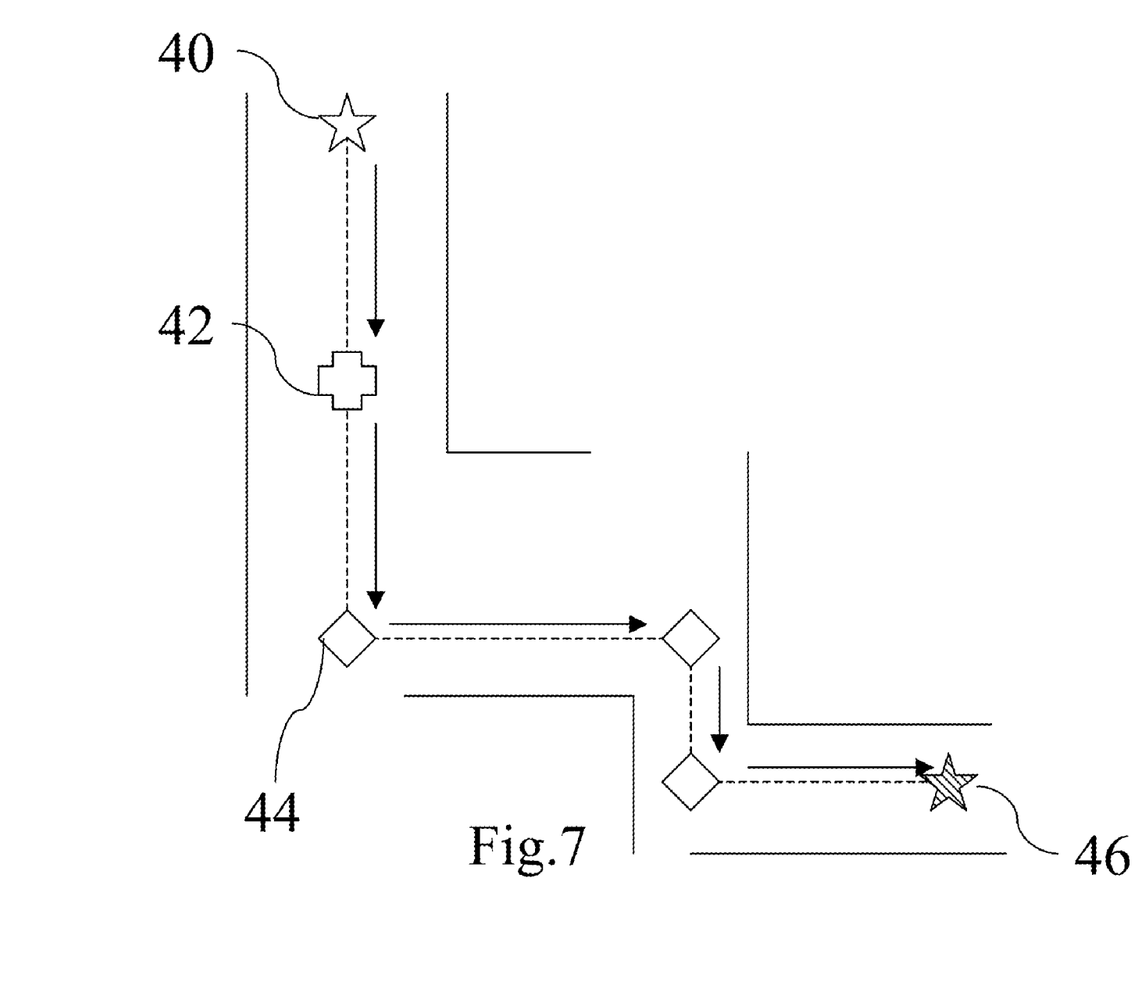
FIG. 7 is a diagram schematically showing the paths of a learning mode and an independent navigation in a non-visual operation state of an automatic navigation device according to an embodiment of the present invention.

When there is no vision available or the automatic navigation device is unable to use vision, the automatic navigation device uses the distance detection device and the position detection device to perform positioning and amend the path. When intending to construct a navigation path in the automatic navigation device, the user operates the automatic navigation device to enter the learning mode and run along the intended path once to memorize the route and form a path in the automatic navigation device. Refer to FIG. 7. The dotted lines represent the planned navigation path; the solid arrowheaded lines represent the physical movement track illustrated between starting and end points 40 and 46 through intermediate positioning and turning points 42 and 44; the solid straight lines represent walls. The distance detection device uses ultrasonic signals to detect the distances between the automatic navigation device and the walls beside and before the automatic navigation device, and then the automatic navigation device records the distance data. The position detection device records the position where the user instructs the automatic navigation device to alter its direction and the angle of turning. When navigating independently, the automatic navigation device compares the distance data recorded in the learning mode with the distance data acquired in the current navigation with ultrasonic signals to amend the path and navigate along the walls. The automatic navigation device compares the position data the user input in advance with the current position data to determine whether the automatic navigation device reaches a turning point. The automatic navigation device alters its direction by an angle recorded in the position detection device.

Figure 8:
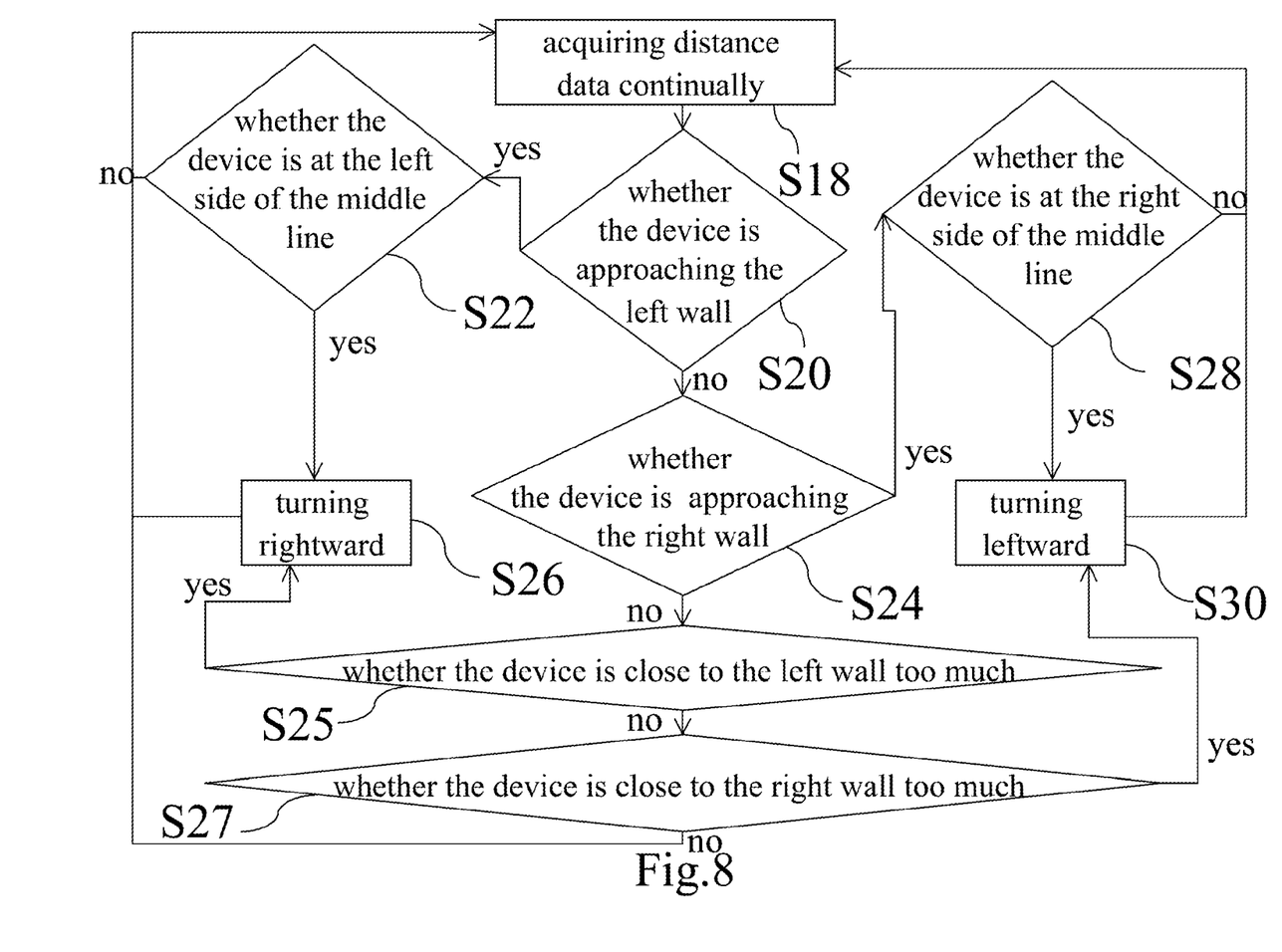
FIG. 8 is a flowchart of a navigation method in a non-visual operation state according to an embodiment of the present invention.

Refer to FIG. 8 a flowchart of the method for controlling the automatic navigation device to navigate along a wall. In Step S18, the automatic navigation device uses the distance detection device to ultrasonically acquire distance data continually. In Step S20, the controller observes whether the automatic navigation device is gradually approaching the left wall according to the received data. If the answer is yes, the process proceeds to Step S22. If the answer is no, the process proceeds to Step S24. In Step S22, the controller verifies whether the automatic navigation device is at the left side of the middle line of the passage according to the received data. If the answer is yes, the process proceeds to Step S26, and the automatic navigation device turns rightward. If the answer is no, the process returns to Step S18. In Step S24, the controller observes whether the automatic navigation device is gradually approaching the right wall according to the received data.

If the answer is yes, the process proceeds to Step S28. If the answer is no, the process proceeds to Step S25. In Step S28, the controller verifies whether the automatic navigation device is at the right side of the middle line of the passage according to the received data. If the answer is yes, the process proceeds to Step S30, and the automatic navigation device turns leftward. If the answer is no, the process returns to Step S18. In Step S25, the controller observes whether the automatic navigation device is close to the left wall too much according to the received data. If the answer is yes, the process proceeds to Step S26, and the automatic navigation device turns rightward. If the answer is no, the process proceeds to Step S27. In Step S27, the controller observes whether the automatic navigation device is close to the right wall too much according to the received data. If the answer is yes, the process proceeds to Step S30, and the automatic navigation device turns leftward. If the answer is no, the process returns to Step S18. In the abovementioned process, after Step S26 or Step S30, the process returns to Step S18 to keep on acquiring distance data.

In conclusion, the present invention proposes an automatic ultrasonic and computer-vision navigation device and a method using the same, which are based on image tracing, image comparing, human face detection, position measuring, path planning, and ultrasonic technologies, and which can learn visual landmarks automatically, optimize the path from a narrow passage, and detect positions and amend the track visually, whereby even the persons not familiar with the computer can also instruct the navigation device and interact with the navigation device. Further, the present invention uses visual and ultrasonic detectors to detect the environment, wherefore the manufacturers can save the hardware cost. Thus, the present invention is a very useful innovation.

The embodiments described above are only to exemplify the present invention but not to limit the scope of the present invention. Therefore, any equivalent modification or variation according to the shapes, structures, characteristics and spirit of the present invention is to be also included within the scope of the present invention.

What is claimed is:

1. A navigation method using ultrasonic signals and computer vision comprising:
    Step (A): a user guiding an automatic navigation device to learn and plan a navigation path, wherein said Step (A) further comprises:
    Step (A1): starting said automatic navigation device to enter a learning mode, and said user standing in front of said automatic navigation device;
    Step (A2): said automatic navigation device following said user when said user is moving;
    Step (A3): detecting and recording coordinates and orientation of said automatic navigation device, and using ultrasonic signals and computer vision to detect environments of said automatic navigation device;
    Step (A4): using computer vision to detect a proportion and a relative position of a face contour, facial features and hair of said user to determine a direction that said user faces toward and then observe whether said user stops to watch an object; if said user is watching an object, executing step (A5) below; if said user does not watch an object, returning to said Step (A2); and
    Step (A5): said automatic navigation device moving toward a position where said user is located, detecting said object and recording images of said object, and then determining whether to end said learning mode; if yes, using recorded data to plan a navigation track, then shortening length of said navigation track to plan said navigation path according to positions of surrounding barriers of said automatic navigation device and rules of preventing said automatic navigation device from colliding with barriers; if no, returning to said Step (A2); and
    Step (B): said automatic navigation device navigating independently, using ultrasonic signals and computer vision to detect environments, comparing data of said environments and data of said navigation path to amend a physical movement track.

2. The navigation method using ultrasonic signals and computer vision according to claim 1, wherein after said Step (A2), said automatic navigation device verifies whether said user is still standing in front of said automatic navigation device; if yes, said automatic navigation device executes Step (A3); if no, said automatic navigation device searches for a position where said user is located.

3. The navigation method using ultrasonic signals and computer vision according to claim 1, wherein in said Step (B), ultrasonic signals are used to detect distances between said automatic navigation device and barriers at two sides thereof, whereby said automatic navigation device amends said physical movement track and navigates on a lane between said barriers.

4. The navigation method using ultrasonic signals and computer vision according to claim 1, wherein in said Step (B), said automatic navigation device detects a current position and a current direction in said physical movement track and compares said current position and said current direction with a related position and a related direction of said navigation path to amend said physical movement track.

5. The navigation method using ultrasonic signals and computer vision according to claim 1, wherein after said Step (A), said automatic navigation device uses computer vision to identify whether said user is an authorized user; if yes, said automatic navigation device executes said Step (B); if no, said automatic navigation device stops to operate.

6. The navigation method using ultrasonic signals and computer vision according to claim 1, wherein in said Step (B), said automatic navigation device uses computer vision to verify whether a current environment is different from a related environment of said navigation path, and then transmit related data to a far-end control center or far-end monitors via a network.

7. The navigation method using ultrasonic signals and computer vision according to claim 1, wherein when using computer vision to detect an environment, said automatic navigation device filters out polarized light damaging images.

8. The navigation method using ultrasonic signals and computer vision according to claim 1, wherein said automatic navigation device operates in a WDS (Wireless Distribution System) mode of an IEEE 802.11 standard and supports dynamic wireless network access and dynamic wireless communication.

9. An automatic ultrasonic and computer-vision navigation device comprising:
    an automatic movement device;
    an image detection device arranged in said automatic movement device, using computer vision to detect surrounding images, and outputting image data;
    a distance detection device arranged in said automatic movement device, using ultrasonic signals to detect distances between surrounding barriers and said automatic movement device, and outputting distance data;
    a position detection device arranged in said automatic movement device, detecting a position of said automatic movement device, and outputting position data; and a controller receiving and recording said image data, said distance data and said position data, planning a navigation path and controlling movement of said automatic movement device according to said image data, said distance data and said position data;

wherein said image detection device demarcates a top wear of a user in an image region according to said user's skin color, body position, body size, and body proportions in images and according to image variation resulting from said user's movements before said image detection device, and then outputs said image data;

wherein said controller identifies whether said automatic movement device faces a lateral of said user according to a ratio of length and width of said top wear of said user in said image region;

wherein when said automatic movement device faces a lateral of said user, said controller identifies a direction that said user faces toward according to a proportion and a relative position of a face contour, facial features and hair of said user; then, responsive to said user stopping to watch an object, said controller controls said automatic movement device to move toward a position where said user is located and controls said image detection device to face toward said direction that said user faces toward to capture images of said object.

10. The automatic ultrasonic and computer-vision navigation device according to claim 9, wherein said controller controls a navigation direction of said automatic movement device according to a horizontal position of said top wear of said user in said image region.

11. The automatic ultrasonic and computer-vision navigation device according to claim 9, wherein said controller calculates a distance between said user and said automatic movement device according to a size and a vertical position of said top wear of said user in said image region; then, said controller controls a speed of said automatic movement device and makes said automatic movement device keep a constant distance to said user.

12. The automatic ultrasonic and computer-vision navigation device according to claim 9, wherein said distance detection device persistently emits ultrasonic signals and receives reflected ultrasonic signals; said distance detection device calculates distances between said automatic movement device and said surrounding barriers surrounding said automatic movement device according to time lags between said emitted ultrasonic signals and said reflected ultrasonic signals, then outputs said distance data.

13. The automatic ultrasonic and computer-vision navigation device according to claim 9, wherein said controller determines positions of said surrounding barriers on said navigation path according to said distance data; said position of said automatic movement device includes coordinates and a direction of said automatic movement device.

14. The automatic ultrasonic and computer-vision navigation device according to claim 9, wherein when said controller controls said automatic movement device to navigate independently, said controller compares a physical movement track of said automatic movement device with said navigation path to amend said physical movement track.

15. The automatic ultrasonic and computer-vision navigation device according to claim 9, wherein said controller uses said image data, said distance data and said position data to plan a navigation track, and shortens the length of said navigation track to plan said navigation path according to positions of said surrounding barriers and rules of preventing said automatic navigation device from colliding with said surrounding barriers.

16. The automatic ultrasonic and computer-vision navigation device according to claim 9, wherein when said controller controls said automatic movement device to navigate independently, said controller compares said distance data with a physical movement track of said automatic movement device to amend said physical movement track and enable said automatic movement device to move on a lane between said surrounding barriers.

17. The automatic ultrasonic and computer-vision navigation device according to claim 9, wherein when said automatic movement device navigates independently, said controller compares said distance data with a path data preshorted in said controller in advance to determine whether said automatic movement device needs to alter its direction; alternatively, when said automatic movement device navigates independently, said controller compares said distance data with said navigation path to determine whether said automatic movement device needs to alter its direction.

18. The automatic ultrasonic and computer-vision navigation device according to claim 9, wherein said controller identifies whether a person is a authorized user; if yes, said controller controls said automatic movement device to navigate independently; if no, said automatic movement device stop to operate.

19. The automatic ultrasonic and computer-vision navigation device according to claim 9, wherein said position detection device is an odometer; said controller is a far-end control device.

20. The automatic ultrasonic and computer-vision navigation device according to claim 9 further comprising a polarizer arranged on said image detection device, wherein a direction of grating films of said polarizer can be manually or automatically varied to filter out polarized light damaging images.

21. The automatic ultrasonic and computer-vision navigation device according to claim 20, wherein said image detection device determines whether reflected light interferes or receiving an instruction of said controller according to pictures of said image data; if yes, said image detection device automatically varies a direction of said grating films of said polarizer to filter out polarized light; if no, said image detection device stops to operate.

22. The automatic ultrasonic and computer-vision navigation device according to claim 20, wherein said image detection device determines whether reflected light interferes or checks whether a computer-vision program is unable to attain an expected result according to pictures of said image data; if yes, said controller controls said image detection device to automatically vary a direction of said grating films of said polarizer to reduce interference of said reflected light; if no, said controller stop to operate.

23. The automatic ultrasonic and computer-vision navigation device according to claim 20, wherein when said automatic movement device navigates independently said controller performs a comparison of an image captured by said image detection device and a landmark image stored in said controller to determine whether said object corresponds to the landmark; if yes, said controller calculates a position and a angle of said landmark with respect to said automatic movement device according to images of said landmark and then compares said position and said angle of said landmark with a position and a direction of said landmark stored in said controller in advance to more accurately estimate current coordinates and a current direction of said automatic movement device and amend said current coordinates and said current direction of said automatic movement device; if no, said controller varies a direction of said grating films of said polarizer and performs said comparison again until all directions of said grating films are used up, or until said comparison confirms said landmark.

24. The automatic ultrasonic and computer-vision navigation device according to claim 9, wherein when said automatic movement device navigates independently, said controller compares said position data and said distance data with a path data stored in said controller in advance to estimate current coordinates and a current direction of said automatic movement device.

25. The automatic ultrasonic and computer-vision navigation device according to claim 9, further comprising a far-end communication device, which is arranged in said automatic movement device, receives said image data, said distance data, said position data and said navigation path in a wired or wireless way, and transmits said image data, said distance data, said position data and said navigation path to a far-end control center in a wireless way directly or via an access point indirectly.

26. The automatic ultrasonic and computer-vision navigation device according to claim 25, wherein when used in an indoor space, said far-end communication device is a mobile access point of an IEEE 802.11 standard and cooperates with other access points to form a wireless mesh network.

27. The automatic ultrasonic and computer-vision navigation device according to claim 26, wherein said far-end communication device is a mobile access point implementing wireless network access.

28. The automatic ultrasonic and computer-vision navigation device according to claim 26, wherein said far-end communication device is a wireless network repeater moved to an area of weak signal to provide signal relay.

* * * * *